W. F. MARANTETTE ET AL 3,293,439
TWO AXIS PHOTOELECTRIC POSITIONING SYSTEM INCLUDING ALTERNATE
AXIS ACTIVATION OF PHOTOCELL
Filed July 9, 1963

INVENTORS
WILLIAM F. MARANTETTE
RUTH B. MARANTETTE
BY Elliott & Pastoriza
ATTORNEYS

United States Patent Office 3,293,439
Patented Dec. 20, 1966

3,293,439
TWO AXIS PHOTOELECTRIC POSITIONING SYSTEM INCLUDING ALTERNATE AXIS ACTIVATION OF PHOTOCELL
William F. Marantette and Ruth B. Marantette, both of 20624 Earl St., Torrance, Calif. 90503
Filed July 9, 1963, Ser. No. 293,642
4 Claims. (Cl. 250—203)

This invention relates broadly to machine control systems and more particularly, to a novel two-axis positioning system for automatically positioning a work in an X, Y coordinate plane in accordance with given coordinate points on a master control member such as a template.

The positioning system of this invention has various different applications, but for purposes of illustrating one embodiment, it will be described in conjunction with the positioning of a work for the drilling of holes such as in the manufacture of printed circuits. In this type of manufacturing, there is usually provided a master template having properly located holes to define the positions of holes to be drilled in printed circuit boards. Thus, the coordinate points or positioning of the holes are transferred from the master template to the work and then the drilling operation may take place.

In accordance with the present invention, a unique two-axis positioning control system is provided in which electrical signals are employed to automatically position the work directly in accordance with coordinate points on a master template.

A primary object of this invention accordingly is to provide a two-axis positioning control system for enabling substantially exact centering of a work or other member at given coordinate points.

More particularly, it is an object to provide a positioning system incorporating servo motor means for automatically positioning a work at substantially exact desired coordinate points in a fully automatic manner to the end that human error is avoided in positioning such a work.

Another important object is to provide a system for positioning the work in accordance with a master template wherein information is automatically derived from the master template and passed to positioning means for the work without the necessity of any human intervention.

Still another object is to provide a two-axis positioning control system in which several works may simultaneously be positioned from the same electrical signals to the end that mass production of identical products from a single template may automatically be carried out.

Another important object of this invention is to provide a control system meeting the foregoing objects which includes safety means in the form of a generated signal to prevent inadvertent operation of a tool when the work is not properly positioned.

Briefly, these and other objects and advantages of this invention are attained by providing a unique photoelectric cell cooperating with a light source and a master template. The template is provided with apertures corresponding to desired given coordinate points at which a work is to be positioned.

The master template and work may be approximately positioned at the desired given coordinate points by any suitable automatic means so that light will pass through the aperture and strike the photoelectric cell. Thereafter, exact positioning of the work to correspond to the exact coordinates desired is automatically effected by suitable servo motors which will move the work in X and Y directions in response to control signals derived from the photoelectric cell. These control signals are provided when the spot of light passing through the master template aperture strikes the cell in an off-center position. Thus, the cell itself includes a light sensitive element of finite area having a geometrical center positioned at substantially the exact coordinate points. When the light strikes this geometrical center, the control means connected to the cell will not pass any signals to the servo motors. On the other hand, when the light is off-center, the control means will provide electrical signals which will move the work and, through a feed-back connection, move the template in such a manner as to cause the light to become exactly centered on the cell.

Towards carrying out the foregoing ends, the cell itself includes a plurality of electrodes preferably four in number equally radially spaced from the geometrical center of the light sensitive area of the cell. The resistances of the cell as measured from its geometrical center to the electrodes are equal. However, when light falls on a portion of the cell closer to one of the electrodes than to the other, unequal resistances will result. By applying voltages to the electrodes, the resulting unequal resistances may be employed to provide the control signals to move the work and, through the feed-back system, the template to a position in which the light will strike the exact center of the cell. At this point all of the resistances as measured from the center of the cell to the electrodes are equal and therefore no further signals will be passed to the servo system and the work will be precisely positioned.

A better understanding of the invention will be had by now referring to a preferred embodiment thereof as illustrated in the accompanying drawings, in which.

Figure 1:
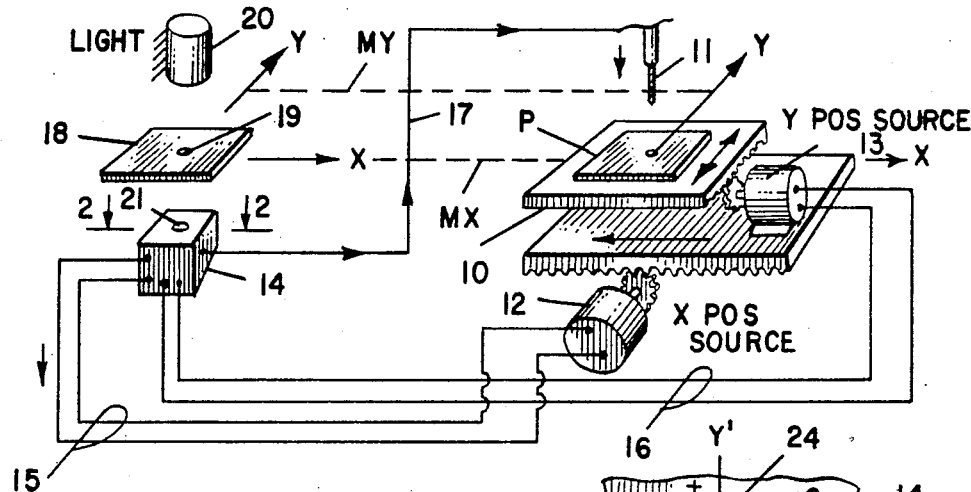
FIGURE 1 is a highly schematic representation of one application of the two-axis positioning control system of this invention.

Referring first to FIGURE 1, there is shown a table 10 and drill 11. A suitable work such as a printed circuit board P is secured to the table 10 and the entire table 10 moved in X and Y directions as indicated by the arrows for properly positioning the work with respect to the drill 11. This positioning operation may be carried out by X position and Y position servo motors indicated at 12 and 13 respectively. These motors are controlled by X and Y position signals generated in a control circuit 14 and passed through leads 15 and 16 respectively. Operation of the drill 11 itself in turn may be controlled by a signal from the control 14 provided on a lead 17.

Assuming it is desired to drill holes in the printed circuit board P in accordance with the coordinate positioning of holes in a master template, the master template may be positioned as indicated at 18. This master template includes a plurality of apertures, one of which is shown at 19, having a given X-Y coordinate position corresponding to the coordinate position in which it is desired to drill the corresponding hole in the printed circuit board P. As indicated by the dashed lines Mx and My, the master template 18 is moved in correspondence with the table 10 in X and Y directions.

Initially, the work P and master template 18 may be roughly positioned at the desired coordinate points by any suitable means. Thereafter, the two-axis positioning control system incorporating the servo motors 12 and 13 of this invention will automatically effect an exact positioning corresponding to the exact center of the aperture.

As illustrated in FIGURE 1, this system includes a fixed light source 20 disposed above the template 18 for shining light through the aperture 19 and opening 21 onto a photoelectric cell positioned in the control circuit 14. The arrangement is such that if the light from the source 20 is exactly centered on the photoelectric cell within the control circuit 14, no signals will be applied to the servo motors so that the table 10 will remain stationary and the work P will be in proper position for drilling. However, if the work and master template 18 are not exactly positioned, the corresponding off-center position of the aperture will result in the light from the source 20 not striking the photoelectric cell within the system 14 at its exact center point giving rise to signals in the leads 15 and 16 to operate the servos and effect an exact positioning.

Figure 2:
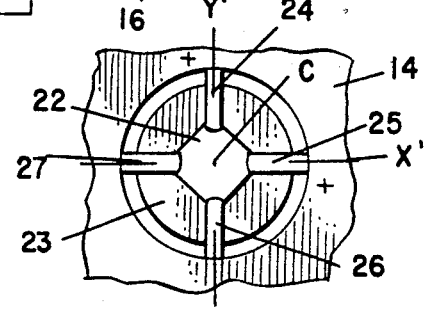
FIGURE 2 is a fragmentary plan view of a preferred type of photoelectric cell incorporated in the system of FIGURE 1.

The photocell structure itself for carrying out the foregoing in accordance with the invention is illustrated in FIGURE 2. As shown, this cell includes a light sensitive resistance element 22 of a given finite area. This element is symmetrical with respect to X' and Y' axes and has its geometrical center corresponding with the origin of these axes as shown. The material of the light sensitive element 22 may constitute cadmium selenide an dhas the property of a given portion changing its resistance when irradiated with light.

The element itself is supported on an insulating wafer 23 which also serves to support a plurality of electrodes indicated at 24, 25, 26 and 27. As shown, these electrodes are connected to the element 22 at points equally radically spaced from its geometrical center C. Further, the points of connection to the element fall on the mutually perpendicular axes X' and Y', the electrodes 24 and 26 being equally spaced on opposite sides of the center and lying on the Y' axis and the electrodes 25 and 27 similarly being equally spaced on opposite sides of the center C and lying on the X' axis.

If the electrical resistance are measured between the center C of the area of the sensitive element 22 and the various electrodes 24, 25, 26 and 27, they will all be equal in the absence of any light, or if light from the source 20 is striking the exact center of the area. On the other hand, these resistances will be unequal should the light strike an area of the cell 22 closer to one of the electrodes than to the others. Essentially, control circuit 14 provides signals only when the effective resistances are unequal. These signals as stated serve to move the table 10 of FIGURE 1 and thus, the template 18 such as to cause the light to be exactly centered on the cell. By this arrangement, exact positioning at desired given coordinate points may be effected.

Figure 3:
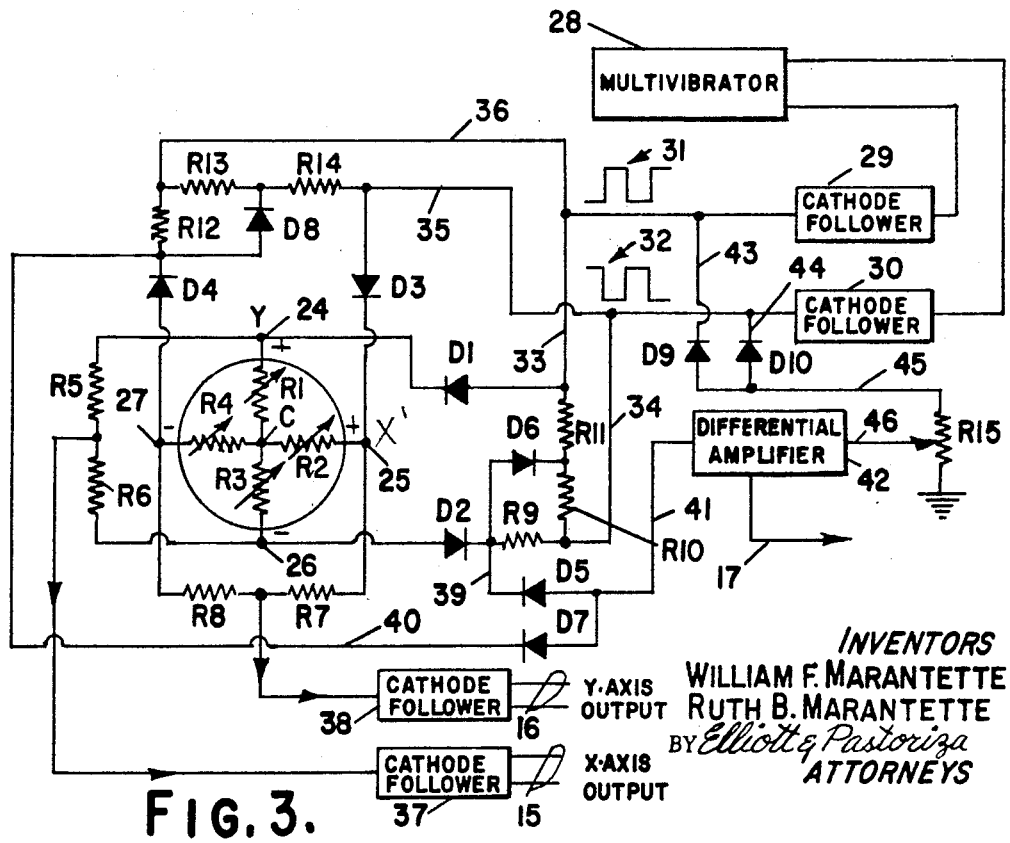
FIGURE 3 is a circuit diagram partly in block form illustrating the manner in which control signals may be derived from the photoelectric cell of FIGURE 2 in accordance with the invention.

Referring now to FIGURE 3, one form of circuit for providing the desired signals is illustrated. In FIGURE 3 the photoelectric cell structure is represented by an equivalent circuit constituting four variable resistances R1, R2, R3, and R4. These resistances are all connected together at the center point C of the cell and their outer ends in turn connect to terminals 24, 25, 26 and 27, the corresponding numbers being used to designate the electrodes of the cell of FIGURE 2. Because of the physical properties of the cadmium selenide cell wherein its resistance will change at any portion irradiated by light, it will be clear that the resistances R1, R2, R3, and R4 constitute an equivalent circuit in that when the light is off-center, the resistance portions represented by the resistances R1, R2, R3, and R4 will become unequal.

In order to detect an inequality in the resistances thereby indicating an off-center positioning of the light on the cell, the electrodes 24 and 26 corresponding to the Y' axis have a voltage applied thereacross. This voltage is such that the electrode 24 is positive with respect to the center and the electrode 26 is negative with respect to the center by the same amount. If the resistances R1 and R3 are equal, the potential of the center C will be zero. However, if the light should strike the at an off-center position closer to the electrode 24 or resistance R1, than to the electrode 26 or resistance R3, the resistance R1 will decrease resulting in a positive potential at the center C. Similarly, if the light should strike a position on the cell area closer to the electrode 26 than to the electrode 24, the resistance R3 will decrease relative to the resistance R1 giving rise to a negative potential at the point C. This zero, positive, or negative potential is detected across the X' axis terminals 25 and 27 and employed to drive the Y-position servo 13 of FIGURE 1 to move the table 10 and thus, through the mechanical connection My the template 18 to a position to cause the light beam to move towards the center of the cell. When it reaches the center of the cell so that the resistances R1 and R3 are equal, no signal will be passed into the Y servo so that the table will be stationary with respect to movement along the Y axis.

Similarly, if the light should strike the cell to the right or left of the center C, to cause the resistances R2 and R4 to become unequal, similar zero, positive or negative voltages will appear at the point C which may be detected across the Y' axis electrodes 24 and 26 and used to operate the X position servo of FIGURE 1 to center the light through the connection Mx to the template at the point C. The respective voltages to the X' axis and Y' axis electrodes are applied alternately in rapid succession so that the Y' and X' positioning of the table and template is effectively carried out simultaneously.

Referring now to the remaining portion of FIGURE 3, a more detailed explanation will be provided. As shown, the desired voltages for the Y' electrodes and X' electrodes are derived from a multi-vibrator 28. The output from the multi-vibrator is passed through cathode followers 29 and 30 to provide low impedance square waves indicated respectively at 31 and 32. These square waves are exactly 180° out of phase. The positive half of the first square wave 31 is applied through a lead 33 and a diode D1 to the Y' electrode or anode 24. Simultaneously, the negative half of the second square wave 32 is passed through the lead 34, resistance R9, and reverse diode D2 to the second Y' axis terminal or cathode electrode 26. These respective wave forms are respectively isolated from the X' axis electrodes 25 and 27 by the diodes D3 and D4 which offer high back impedances to the half waves when of the polarity described.

As stated heretofore, with the positive and negative voltages applied simultaneously to the electrodes 24 and 26, any non-centering of the light beam along the Y' axis will result in a signal appearing at the center C of the cell.

A half a cycle later, the negative portion of the square wave 31 will pass through the branch lead 36, resistance R12 and diode D4 to the X' axis electrode 27, this negative signal being passed by the diode D4. Also, the now positive portion of the square wave 32 will simultaneously be passed through the lead 35 and diode D3 directly to the X' axis electrode 25 so that a positive and negative signal is applied across the electrodes 25 and 27. These signals are isolated from the Y' axis electrodes 24 and 26 by the diodes D1 and D2 respectively, which now exhibit high back impedances to the wave forms. Thus, there again will be developed a signal at the center C of the cell if the light is off-center along the X' axis.

As shown in FIGURE 3, the circuit includes summing resistances R5 and R6 connected across the Y' axis electrodes 24 and 26. A center lead from the junction of R5 and R6 passes through a cathode follower output circuit 37 to provide positive, zero, or negative signals on the X axis output leads 15. Similarly, there are provided a pair of summing resistances R7 and R8 across the X' axis electrodes 25 and 27, the center junction point of which connects to cathode follower 38 and the Y axis output leads 16.

In the operation of the circuit described thus far, assume first that the spot of light from the light source 20 is closer to the Y' axis anode electrode 24 than to the Y' axis cathode electrode 26. In this case, as stated heretofore, the resistance R1 is decreased and the resistance R3 increased so that there appears at the point C a positive voltage. This positive voltage is detected at the junction point of the summing resistances R7 and R8 and passed through the cathode follower 38 and to the Y axis output leads 16. If this signal is positive, it will operate the Y position servo motor 13 of FIGURE 1 in a proper direction to move the printed circuit work P in a negative Y axis direction. This movement in turn causes the template 18 to move in a negative Y axis direction and thus move the spot of light passing through the aperture 17 towards the center C of the photo cell. When the spot of light reaches the center C, the resistances R1 and R3 will be equal so that there will no longer appear any voltage at the center C and thus, the signal to the Y axis position servo will terminate.

Similarly, if the spot of light is to the right or left along the X' axis, a positive, zero, or negative signal will be developed at the point C which will be detected at the junction of the summing resistances R5 and R6 and passed through the cathode follower 37 to the X axis output leads 15. The signal on the leads 15 will then operate the X position servo motor 12 in a proper direction, depending upon the polarity of the signal to move the printed circuit board P and thus the template 18 in a proper direction to cause the spot of light to move towards the center C of the cell.

The rapid sampling the X' and Y' electrodes by means of the square waves from the multi-vibrator 28, as described, results in exact centering of the printed circuit board P at desired given coordinate points corresponding to the exact center of the aperture 19 in the master template 18.

In the event that no light is striking the cell, it is desirable to prevent any inadvertent drilling of the printed circuit board. Accordingly, provision is made to provide a signal in the event no light is falling on the cell to render the drill 11 inactive. The control for providing this signal includes leads 39 and 40 connecting from the forward terminals of the diodes D2 and D4 respectively, at their junction point with resistances R9 and R12. As shown, these leads pass through diodes D5 and D7 to a common lead 41 to connect into one side of a differential amplifier 42. The other side of the differential amplifier receives the negative portions of the square wave signals 31 and 32 from leads 43 and 44 passing through diodes D9 and D10 and a common lead 45. As shown, a resistance R15 connects between the lead 45 and ground and a proper negative voltage may be tapped off by a lead 46 passing into the other side of the differential amplifier 42. When the voltage on lead 41 exceeds the voltage on lead 46, a signal will be passed through the output 17 to prevent operation of the drill 11 as described in conjunction with FIGURE 1.

In the operation of this circuit, when there is no light falling on the photocell, all of the resistances R1, R2, R3, and R4 have very high values and very little current therefore passes through these resistances. As a consequence, current through the resistances R9 and R12 respectively, is very small and the voltage drops across these resistances are negligible. Since resistances R9 and R12 have very little voltage drop across them, the diodes D5 and D7 will rectify substantially the full value of the negative square waves and their full D.-C. output is thus passed through lead 41 to the differential amplifier. Also, the diodes D9 and D10 will rectify the square waves 31 and 32 and pass the rectified signal through lead 45 to the differential amplifier as described so that there are provided D.-C. negative input voltages on opposite sides to the differential amplifier. By now adjusting the resistance R15, to cause the voltage on lead 41 to exceed the voltage on lead 45, there is continuously developed an output signal on the lead 17.

If now light is falling on the cell, there will develop voltage drops across the resistances R9 and R12 which will reduce the magnitude of the square waves rectified by the diodes D5 and D7. As a consequence, the negative voltage applied to the lead 41 to the differential amplifier is reduced and when this falls below the negative voltage on the lead 46, no signal will be produced on the output lead 17. The resistance R15 can be suitably tapped at a point to adjust the value of the voltage on lead 46 at which the "no light" output signal is present.

The diodes D6 and D8 serve to clamp or maintain constant voltage drops across the resistances R9 and R12 so that approximately the same positive and negative voltages during the sampling periods will be applied to the corresponding electrodes 24, 26, and 25, 27.

From the foregoing description, it will be evident that exact centering of the light spot on the photocell is automatically carried out. The actual size of the spot is not important nor is its intensity, provided that the diameter of the spot is less than the distance between the various electrodes on the cell. This is because the differences in the cell resistance values function to generate the signals rather than the absolute values of any of these resistances.

In an actual embodiment of the invention, the respective square waves 31 and 32 are provided at a frequency from the free-running multi-vibrator 28 of approximately 600 cycles per second. The sampling positive and negative voltages across the Y' and X' axis electrodes respectively, or peak to peak voltages of the square waves, are plus 50 and minus 50 volts. The preferred spacing of the electrodes on the cell are approximately .045 inch from their opposite electrodes. Template holes as small as .001 inch in diameter and as large as .035 inch in diameter can be positioned very accurately by means of this system.

Modifications falling clearly within the scope and spirit of this invention will occur to those skilled in the art. Thus, while only particular circuit components have been shown, other equivalent circuit components for deriving control signals in any equivalent manner may be provided. The two-axis positioning system is therefore not to be though of as limited to the exact embodiment set forth merely for illustrative purposes.

What is claimed is:

1. A photoelectric system for controlling an operation by electrical signals, including: a photoelectric cell comprising a light sensitive element whose resistance varies in response to light striking said element, said element being of finite area and of symmetrical configuration relative to two mutually perpendicular axes, the exact center of said area coinciding with the origin of said axes; first, second, third and fourth electrodes positioned on said axes at points equally spaced from said origin, said first and third electrodes constituting a first pair of electrodes on opposite sides of said origin along one of said axes and said second and fourth electrodes constituting a second pair of electrodes on opposite sides of said origin along the other of said axes; means connected to said electrodes for alternately applying voltages to said first and second pairs of electrodes, the electrical resistances of said element measured from said center to said electrodes, respectively, all being equal when light strikes the exact center of said area and being unequal when light strikes a portion of said area closer to one electrode than to another; and means connected to said electrodes for providing said electrical signals from said first pair of electrodes when voltage is applied to said second pair, and from said second pair of electrodes when voltage is applied to said first pair only when said resistances are unequal.

2. A system according to claim 1, including means responsive to said electrical signals for moving said light in a direction to center it on said element whereby exact centering of said light is automatically effected.

3. A photoelectric system for positioning a work along X and Y axes at right angles to each other in accordance with a given coordinate position in an X and Y coordinate plane on a master template, comprising, in combination: a table for supporting said work; X-positioning and Y- positioning servo motors for moving said table along the X and Y axes in first directions respectively in response to positive signals received thereby and in opposite directions respectively in response to negative signals received thereby and for holding said table in a stationary position when no signals are received in said servo motors; a tool for effecting an operation on said work after said work is positioned; a photoelectric cell positioned on one side of said master template; a light source on the other side of said master template, said master template having an aperture at approximately said given coordinate position for receiving light from said source and passing it to said photoelectric cell; means interconnecting said master template and table for moving said master template in response to movement of said table; and control signal generating means connected to said photoelectric cell and said servo motors and responsive to an off-center positioning of said light on said cell to pass signals to said servo motors to move said table and thereby move said master template in a direction to center said light on said cell, said control signal generating means ceasing to pass signals to said servo motors when said light is centered on said cell whereby said work is positioned in substantially exact correspondence with the center of said aperture in said master template, said control signal generating means including means for passing a signal in response to absence of light on said photocell to prevent operation of said tool.

4. A system according to claim 3, in which said photoelectric cell comprises a symmetrical light sensitive resistance element; an insulating wafer mounting said element so that the geometrical center of said element defines the center of said photoelectric cell; first and third electrodes constituting a first pair extending from points on said element equally spaced on opposite sides of said center in alignment with said Y axis for said template; and second and fourth electrodes constituting a second pair extending from points on said element equally spaced on opposite sides of said center in alignment with said X axis for said template, said control signal generating means including means for alternately applying voltages across said first and third electrodes and across said second and fourth electrodes in rapid succession; and means connected to said electrodes and responsive to voltages developed across said first pair when voltage is applied to said second pair and to voltages developed across said second pair when voltage is applied to said first pair resulting from unequal changes in the resistance paths between said electrodes when said light is in an off-center position on said cell to provide said signals for said servo motors.

References Cited by the Examiner

UNITED STATES PATENTS

| | | | |
|---|---|---|---|
| 2,740,901 | 4/1956 | Graham | 250—211 |
| 2,866,506 | 12/1958 | Hierath et al. | 83—71 |
| 2,879,405 | 3/1959 | Pankove | 250—211 |
| 3,028,500 | 4/1962 | Wallmark | 250—211 |
| 3,194,967 | 7/1965 | Mash | 250—211 |

RALPH G. NILSON, *Primary Examiner.*

M. ABRAMSON, *Assistant Examiner.*